Jan. 28, 1936.        H. T. WHEELER        2,028,961
MAKING OF PACKING RINGS
Filed Feb. 12, 1931         2 Sheets-Sheet 1

INVENTOR.
Harley T Wheeler

INVENTOR.

Harley T Wheeler

Patented Jan. 28, 1936

2,028,961

UNITED STATES PATENT OFFICE 2,028,961

MAKING OF PACKING RINGS

Harley T. Wheeler, Dallas, Tex.

Application February 12, 1931, Serial No. 515,232

3 Claims. (Cl. 154—2)

This invention relates to certain new and useful improvements in manufacturing packing rings and its chief advantage lies in a capability of forming thin annular rings of packing material into the desired shape of the finished packing ring, without injury to the structure of the raw material.

One advantage of this invention is the possibility of using rings of thin material to form the packing ring, regardless of the width or depth of the finished ring.

A further advantage is that a ring of any depth may be made by a multiplicity of parts, each exactly similar in formation and characteristics.

A still further advantage is that the layers, or laminations of the finished ring are made parallel to each other before they are pressed into the final shape, and that the edges of the laminations will lie in concentric surfaces when the ring is completed.

Another advantage is that every finished packing ring may be made exactly alike in thickness and weight.

Still another advantage is that the greatest density of the finished packing ring will be at the outer edges.

Yet another advantage is that the necessity of applying binders to the material before moulding, is eliminated.

A still further and important advantage is the great speed and precision of the process, making possible the quantity production of an article of quality that heretofore has been impossible of correct manufacture.

With these objects and advantages in view, further objects and advantages will be shown in connection with a description of the construction and method, accompanied by the drawings, wherein.

Figure 1:
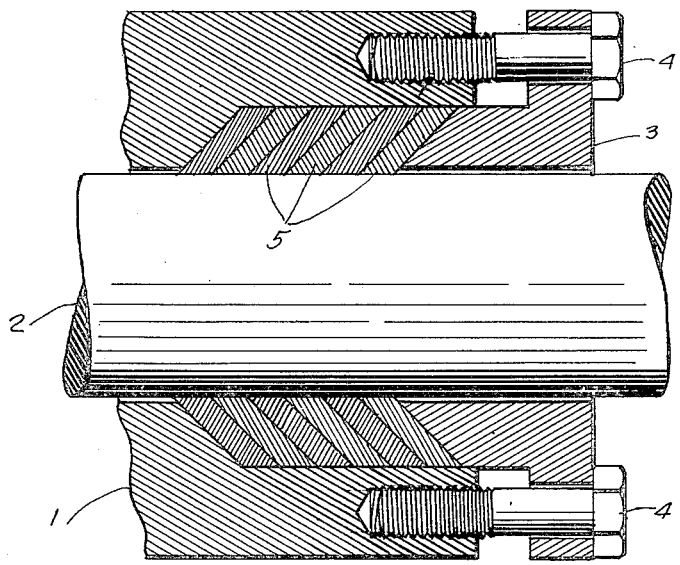
Figure 1 is the cross-section of a stuffing-box containing a series of cone-shaped packing rings made according to this process.

Referring now especially to Figure 1, the casing 1 is an extension of a pump cylinder containing a stuffing-box thru which a rod 2 extends. The series of packing rings 5 are cone-shaped and are held in place against the bottom of the stuffing-box by the gland 3, the latter also being cone-shaped to fit against the outside packing ring 5. The tension of the series of packing rings 5 is controlled by the cap screws 4, 4. There is a clearance between the casing 1 and the rod 2, permitting any medium under pressure in the pump chamber to move outwardly and press against the packing rings 5. This action results in a firm contact of the packing rings 5 with the rod 2, thereby preventing any leakage from the pump chamber. The greater the pressure against the packing rings 5, the greater will be their friction against the rod 2, hence the less chance of leakage past them. In Figure 1, as shown, the rings are positioned to resist leakage of pressure from the pump cylinder; should a vacuum occur on the instroke of the rod 2 during any part of the cycle of operation, it is easily understood that part of the packing rings 5 should be reversed in position, to seal the joint under all ranges of vacuum and pressure.

Figure 2:
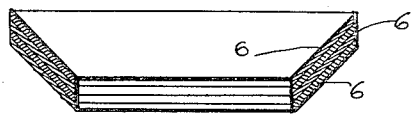
Figure 2 is the cross-section of one cone-shaped packing ring which is shown in the stuffing-box of Figure 1.

In Figure 2 is indicated a cross-section of one of the packing rings 5, of Figure 1. An annular ring of material of desired thickness is reformed into a cone-shape, by a process which will be explained later. Each cone-shaped layer is a lamination, the surfaces of all laminations being parallel to each other, as shown by 6, 6, 6. It should also be evident that the edges of all of the laminations, 6, 6, 6, both inside and outside, are concentric respectively with the rod 2 and the stuffing-box wall of Figure 1. Each packing ring when cut across a diameter is symmetrical. When the laminations are compressed to form the finished ring, each lamination is acted upon independently by any pressure which passes thru the preceding packing rings or laminations, and each layer forms a close contact with the rod 2 in some proportion to the actuating pressure, to seal off any leakage.

Before proceeding with the description of this process, it would appear necessary to outline the present methods of forming moulded packing rings which bear a direct relation to the improvements of this invention. Nearly all moulded rings as now made have an application of some binder applied to the material while the latter is in strip form. The strips of material are then wound into a spiral ring, being formed around a suitable mandrel, the binder previously applied holding the layers together. Then the spiral-wound ring is formed in dies under intense pressure into the final exact shape, the layers assuming a helical position. The binders used during manufacture do three useful things; first, holding the spiral ring together; second, holding the spiral-wound layers together while the ring is changed to some form of a helical wound ring; third, holding the finished ring together during shipment and for installation in the machine. Essentially, the principle of moulded rings as now made, is to change a spiral-wound ring into a helical wound type in dies by stretching the outer parts of the layers, and by compressing the inner edges; it should be apparent that the density of the finished ring is greater at the inner edge than at the outer. There is a wide use for such rings on account of their low cost, but when used in some liquids which are absorbed by the packing material, the compressed packing material adjacent the center then expands and the length of the packing adjacent to the rod is lengthened more than at the outer edges. This type of ring is difficult to adjust under the conditions mentioned and usually fails in service due to excess friction against the rod caused by compression of the gland to stop leakage by the stuffing-box walls. The grinding away of the packing ring surface which contacts with the rod occurs on reciprocating work at high pressures, and on centrifugal pump shafts at nominal pressures.

Figure 8:
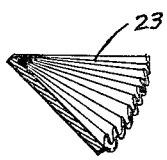
Figure 8 is a cross-section of the annular ring after it has been crimped into a cone-shape, on line 8—8 of Figure 5.

Reference is also now made to my application Serial Number 584,093, filed December 31st, 1931, in which a detailed discussion of the reactions of porous bodies is discussed, as referred to the action of pressure. The porosity of a ring affects two reactions which are germane to this process, namely the longitudinal and peripheral. In Figure 8 of the beforementioned application, the width of a segment affects the amount of the longitudinal reaction, and so does the porosity thruout the segment. As to outer and inner periphery reactions, the porosity is of vital importance; if the ring is denser at the center, expansion due to saturation will enlarge the inner diameter and this action must be overcome by gland adjustment. If dense on the outer areas, the expansion will occur in that region.

The variations of ring periphery reaction call attention to the usage to which a ring should be put. It should be obvious that a ring made by this process should be used with the moving surface inside, that is, it is the ideal construction for a stuffing-box packing ring, as opposed to the piston-type ring. The life and utility of a packing ring depends on seepage flow thru the structure—not leakage between the packing and the contiguous surface. As this type of ring has a greater degree of porosity at the inner surfaces, a higher seepage flow will be caused than at the box wall. Contrariwise, the expansion of this ring at the box wall will assist making a tight joint, with less gland pressure. As the seepage flow of pressure thru a ring structure of conical shape is usually sufficient to lubricate the moving surface, this type is an improvement not before devised.

Further reference is made to my applications Serial 526,288, filed March 30, 1931, Serial 533,430, filed April 28, 1931, and Serial 537,658 of May 15, 1931, in which twenty four laws of friction expressed in terms of porosity and saturation have been disclosed. My research on saturation proves that for a packing ring to operate efficiently, the seepage flow must be directed and regulated to obtain correct results. The porosity and density of the component parts of the packing ring are controlling factors. The method herein described causes a difference of porosity at inner and outer regions, regulates the peripheral and longitudinal reactions and is a practical expression of the laws before mentioned. The result is a considerable drop in friction with an increased life and less wear.

By my process, herein described, the density of the packing ring is made greater at the outer edge, being therefore particularly useful on rotating shafts, as the adjustment of the packing gland will compress the rings at the outer edge, without increasing the friction of the ring with the shaft. This application for Letters Patent is similar to a former application, Serial Number 509,622, the latter describing a method of crimping a strip of packing material, and is also similar in that the use of binders during the shape forming process is not necessary and not desirable.

Apparently binders have always been necessary for manufacturing moulded packing rings, yet are admitted to be a hinderance to successful operation, especially when the ring is exposed to temperature. As the production of a moulded ring with the greatest density of material at the outer edges has been a failure, chiefly due to the use of binders prior to moulding, the damage so caused is here considered. Former attempts to make this type of ring consisted in cementing together a series of thin annular rings of material, or using one ring of the desired final thickness and then impressing the desired shape by dies, it being necessary that the outer diameter of the annular rings be decreased by compression. This results in the cemented sections, or the assembly, binding between the punch and die, and sections being sheared off. Also, the diameter of the original annular rings is larger than that of the finished shape, hence the material placed in the die is wrinkled and distorted. The requirement of a successful moulded packing ring is that the layers be parallel and that the edges of all laminations or parts on the edges lie in concentric surfaces. That this is attainable by this process will become apparent by the description of Figure 5, a crimping machine.

The crimping machine as here used is for shortening the outside edge of an annular ring, or blank of material. In explanation of the process, for example, a ring which is crimped from the outside edge, the corrugations being deepest at the larger diameter and tapering off to nothing at the smaller diameter, will naturally take the shape of a cone, the slope depending upon the depth of the corrugations. To make a truncated cone of a certain inside and a certain outside diameter, it is necessary to begin with the correctly dimensioned blank. However, the same sized blank will make an infinite number of cones, each of a different slope. After the truncated cone is formed, it is ready to be assembled with others to form the required thickness of finished packing ring. As the cones will be of the same slope, the layers of the packing ring will be parallel and the edges of the laminations will lie in common surfaces. The moulding dies are used only to press the cones closely together there being no sliding action of the layers on each other to align the edges. There is therefore no necessity of using a binder prior to moulding.

Figure 5:
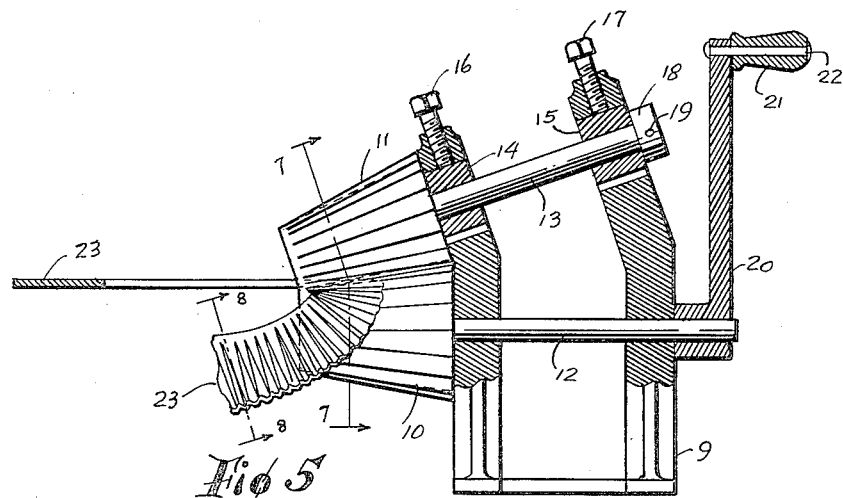
Figure 5 is a perspective in partial cross-section showing a crimping machine for making packing rings according to this process.
Figure 7:
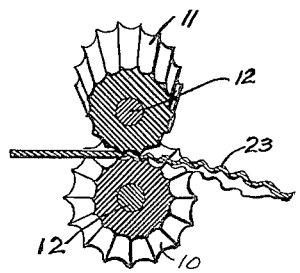
Figure 7 is a cross-section of the crimping rolls, on line 7—7 of Figure 5.

To complete the description of Figure 5, the crimping machine is composed of a base 9, the crimping rollers 10 and 11 and the parts incidental to operating the rollers. The roller 10 is mounted on the shaft 12, is supported on rigid bearings made in the base 10, and is positioned endways by the handle 20, the latter being fixed to the shaft 12. The handle 21 is rotatable on pin 22, the latter being fixed to the handle 20, and is a convenient means to rotate the shaft 12. The crimping roller 11 is mounted on the shaft 13, the latter being supported in the adjustable bearings 14 and 15. A collar 18 is fixed to the shaft 13 by a pin 19, the latter means holding the roller 11 in a permanent position against the frame 9. The cap screws 16 and 17 respectively are used to adjust the bearings 14 and 15, to regulate the clearance between the crimping rollers 10 and 11. In Figure 7 is shown a cross-section of the crimping rollers 10 and 11 on line 7—7 of Figure 5. Both rollers are fluted, deeply at the larger diameter and tapered to nothing at the surface of the smaller diameters of both rollers. The crests of the flutes of one roller mesh with the troughs of the flutes of the mating roller, the amount of meshing being regulated by the cap screws 16 and 17 of Figure 5. The annular ring of packing material 23 is crimped on the outside edge as it passes between the rollers 10 and 11, taking the form of a truncated cone as shown in Figure 5.

Figure 6:
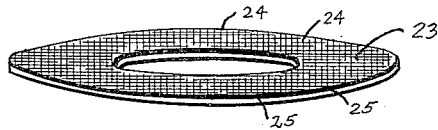
Figure 6 is a perspective of the annular ring from which the packing ring laminations are made.

Figure 6 indicates the annular ring, or blank, which is used for making the truncated cone, or a lamination of the finished packing ring. It should be apparent, that no matter how a piece of material may be woven, a piece of cloth being now considered, that the inside hole when cut will intersect all of the fibers at their ends. There will be no fibers running parallel with the circumference, the cloth is therefore flexible in like manner to a strip of cloth cut on the bias. Fibers 24, 24 intersect fibers 25, 25 at an angle. This relation of fibers makes the corrugations very flexible and readily formed. Other materials such as fibers and ductile metals can be as readily crimped and used for the production of packing rings, but the relation of the fibers of woven cloth when used in an annular ring, contribute to the flexibility of the packing ring while in service.

Figure 9:
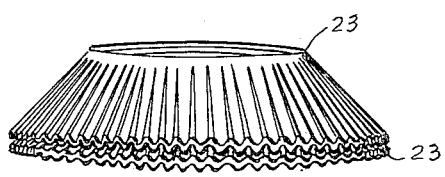
Figure 9 is a perspective of the method of stacking the packing ring laminations, after they have been crimped.

Figure 8 is a cross-section of the annular ring 23, on line 8—8 of Figure 5, indicating the gradual change from an annular ring to a truncated cone, as the crimping process advances. After a number of truncated cones 23 are formed, they are stacked one on another, as shown in Figure 9, the surfaces of all of the layers being parallel to each other and the inside and outside edges lying in concentric surfaces. The cones may be placed in a die for completing the finished ring, pressure from the dies acting only to bring the layers 23 into close contact to secure the required density to resist pressure and prevent seepage thru the ring. The final step of applying pressure to the stack of rings does not distort the fibers of any of the rings.

Figures 3, 4:
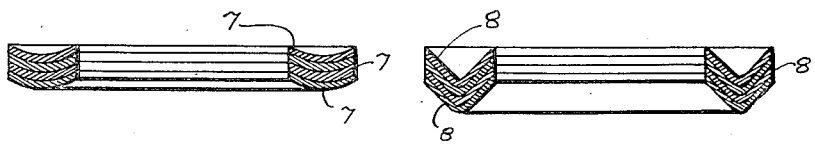
Figure 3 is the cross-section of a cup-shaped packing ring made according to this process.
Figure 4 is the cross-section of a V-shaped packing ring made according to this process.

While a cone-shaped packing ring has been used as the example for justifying this process, it should be apparent that a variety of shapes may be produced from annular ring blanks. In Figure 3 is shown a cup-shaped ring which is difficult to form so that it will be entirely flexible, stretching of the material structure being excessive if a spiral-wound ring is used as a basis for final formation. In this style, Figure 3, the rollers 10 and 11 would be convex and concave respectively, the flutes being deepest at the center of each. The thin annular ring of material from which a cup shaped type is formed will be larger at the outside diameter, and smaller at the inside diameter than the finished ring, as the crimping will gather the material at the center of the ring face. As shown in Figure 6, the fibers of cloth, being the material specially referred to, the structure of an annular ring is similar to a strip of cloth cut on the bias, hence when gathered at the center of the ring face, the fibers will easily take the new position under the crimping rolls. Other materials, such as fibers and ductile metals may be used, but the relation of the fibers of a cloth is especially valuable in contributing to the flexibility of the ring while in service. The greatest density of the cup-shaped ring will be middle way between the inside and outside edges of the finished packing ring. After enough cup-shaped rings are formed they are stacked one on another, as shown by 7, 7, 7 of Figure 3, the assembly placed in suitable dies, the pressure from the dies acting only to bring the layers 7, 7, 7 into close contact to secure the required density to resist pressure and prevent seepage thru the packing ring.

Another useful shape is that of a pressure-set, V-shaped ring as shown in Figure 4. This type is difficult to form so that it will be flexible while in service, the stretching of the material structure being excessive if a spiral-wound ring is used for primary formation. In this style, of Figure 4, the rollers 10 and 11 would be internal and external V-shape respectively, the flutes being deepest at the center of each roller face, the point of the V. The thin annular ring from which this V-shaped type is made will be larger at the outside diameter and smaller at the inner diameter than the finished ring, as the crimping will gather the material at the center of the ring face, at the point of the V. As is shown in Figure 6, the fibers of a cloth, being the material specially referred to, the structure of such an annular ring is similar to a strip of cloth cut on the bias, hence when gathered at the center of the ring face, the fibers will easily take the new position under the crimping rolls. Other materials, such as fibers and ductile metals may be used, but the relation of the fibers of cloth is especially valuable in contributing to the flexibility of the ring while in service. The greatest density of this V-shaped ring will be at the point of the V. After enough V-shaped rings are formed they are stacked one on another, as shown by 8, 8, 8 of Figure 4, the assembly being placed in suitable dies, the pressure of the dies acting to bring the layers 8, 8, 8 into close contact to secure the required density to resist pressure and prevent seepage thru the ring.

Referring now to the operation of this process, especially as it refers to the formation of cone-shaped rings as in Figure 5, materials which have a measure of stiffness, such as woven asbestos, any cloth with wire insertion and the like, will retain a crimp indefinitely. But such materials such as cotton will straighten again after the crimping is performed. Such soft materials are preferably treated with a stiffener, which after drying will have a glossy surface and will cause the material to retain a crimp, yet does not act as a binder. For example, paraffin will harden quickly after being applied to cloth and cause the fabric to retain the crimp, yet may dissolve after the ring is put into service; the stiffener will permit the layers to slide on each other any amount that might be necessary, yet has little holding power. There are unlimited numbers of similar stiffeners which may be used in like manner.

After the finished packing rings are taken from the mould, it will be possible to spray or paint the outside edges with some tough, elastic cement, such as a lacquer. This will maintain alignment of the ring for shipping purposes, but will wear off immediately after the ring is placed in service and permit each layer to be acted upon by the pressure.

Should it be desired to permanently cement the layers of the rings together to meet certain conditions of operation, by this process such binders are applied after the crimping is performed, and just before moulding. Thus the binder will not interfere with the positioning of the layers, and the edges of the material strip can be brought to contact with the inner and outer diameters of the dies.

It should be apparent that the process herein described is capable of unlimited variations and that it may be used in ways not described herein in detail. Such variations, however, as are included in the appended claims, are construed as being based on the principle of this process.

I claim:

1. A packing made up of an integral ring of material, corrugations in the outer periphery thereof extending radially inward substantially the width of the ring whereby the ring is of a truncated cone configuration with the particles of the material on the inner periphery of the ring substantially unmolested.

2. A truncated cone packing made up of a plurality of identical rings, each ring comprising an annular integral ring of material, inwardly tapering radial corrugations in each ring, said corrugations being of less length than the radial width of the material and so arranged that the abutting surfaces of contiguous rings are parallel, the density of the rings at the center being undisturbed and the same as the normal density of the original material.

3. A method of forming a lamination for use as a packing made from a ring of material having a uniform fabrication, including the steps of so pressing the ring that the configuration of the ring will be altered, and so that the normal arrangement of the particles with respect to each other on the inner portion of the ring will be retained, and so pressing the ring that the outer portion will have an increased density.

HARLEY T. WHEELER.